(No Model.)

W. T. G. COBB.
SEEDING ATTACHMENT FOR PLOWS.

No. 460,176. Patented Sept. 29, 1891.

Witnesses
Edwin L. Bradford
Curt Lammond

Inventor
Walter T. G. Cobb
By his Attorney
Wm C. McIntire

THE NORRIS PETERS CO., PHOTO-LITHO., WASHINGTON, D. C.

UNITED STATES PATENT OFFICE.

WALTER T. G. COBB, OF MIDWAY, ALABAMA.

SEEDING ATTACHMENT FOR PLOWS.

SPECIFICATION forming part of Letters Patent No. 460,176, dated September 29, 1891.

Application filed June 17, 1891. Serial No. 396,572. (No model.)

*To all whom it may concern:*

Be it known that I, WALTER T. G. COBB, a citizen of the United States, residing at Midway, in the county of Bullock and State of Alabama, have invented certain new and useful Improvements in Seeding Attachments for Plows; and I do hereby declare the following to be a full, clear, and exact description of the invention, such as will enable others skilled in the art to which it appertains to make and use the same.

My invention relates to certain new and useful improvements in seeding attachments for cultivator and other plows.

It has for its object to provide an attachment which may be readily and expeditiously secured to or detached from the frame of the plow, and which shall also be capable of such adjustment in its parts as to render it available for sowing seed of various kinds or fertilizers; and with these ends in view my invention consists of the details of construction and arrangement and combination of parts hereinafter in detail described and specifically claimed.

In order that those skilled in the art to which my invention pertains may know how to make and use the same, I will proceed to describe its construction and operation, referring by letters to the accompanying drawings, in which—

Figure 1:
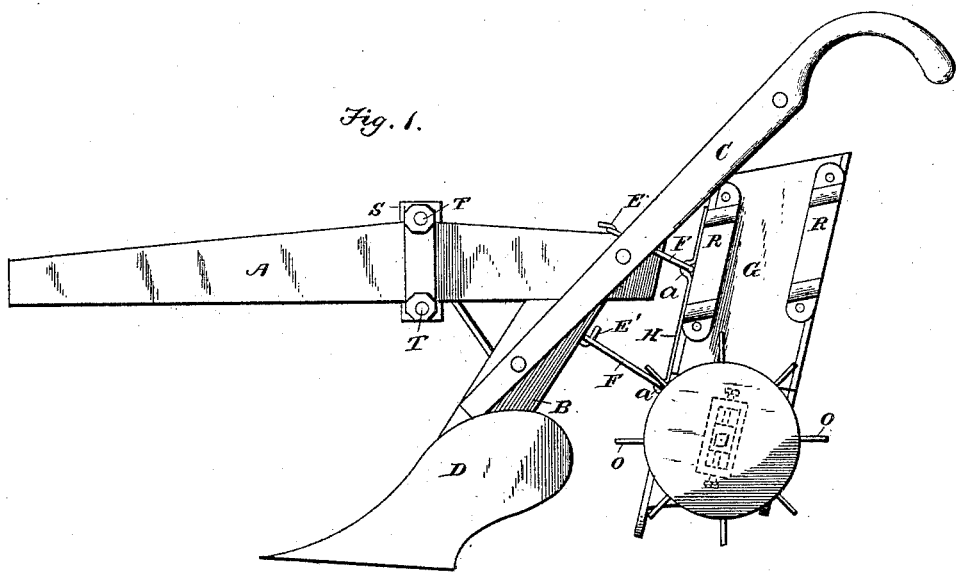
Figure 2:
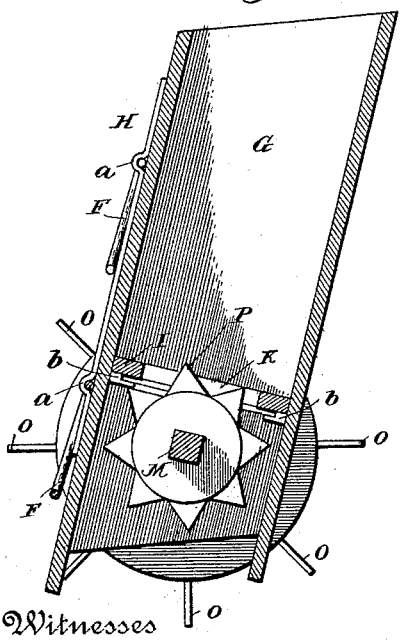
Figure 3:
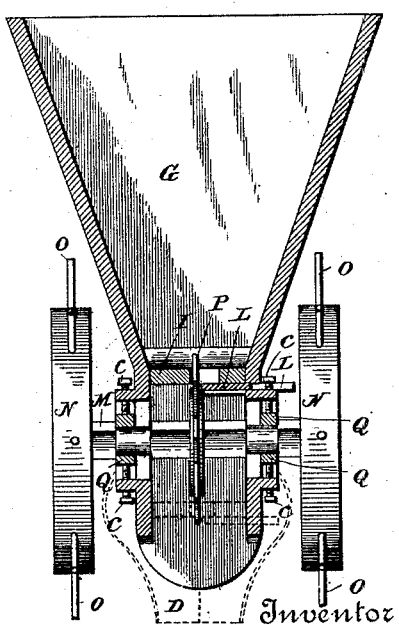

Figure 1 is a side elevation of a cultivator or double mold-board plow with my improved seeding device secured thereto. Fig. 2 is a longitudinal central section of the seeding device, and Fig. 3 is a transverse vertical section of the same.

Similar letters denote like parts in the several views.

A represents the beam of a plow; B, the standard; C, the handles, and D the share and mold-board, the latter being preferably a double mold-board, all of the construction usual in plows.

On top of the beam, near the rear end, is secured a hook E, and on the rear of the standard a similar hook E' is secured. These hooks may be formed on the ends of bolts adapted to pass through the beam and standard and secured in place by suitable screw-nuts, or they may be secured in any other suitable manner. These hooks are adapted to receive the front ends of loops or bails F, hinged to the front end of a seed or guano hopper G, so as to hold the same suspended behind the plow and between the handles G'. The means I have shown for connecting the bails or loops F to the hopper consist of metal straps H, secured to the two front edges of the hopper and provided with eyes $a$, through which the bails or loops pass.

The hopper G is made of any form; but I prefer to make it, as most clearly shown at Figs. 2 and 3, larger at the top and contracted at the bottom, in order that a larger supply of seed or guano or the fertilizer may be carried, and at the same time having the lower or distributing end of such proportions that it will pass any obstruction that the plow will pass, and thus avoid the danger of breakage of the seeder device.

In the hopper G, a suitable distance above the lower end, I place a bottom I, provided with an elongated opening or slot K for the seed or fertilizer to fall through to the ground. The size and capacity of this slot is controlled by an adjustable slide L, (see Fig. 3,) which travels in guides or ways $b\ b$. (See Fig. 2.)

In the sides of the hopper G, below the bottom I, passes a shaft or axle M, to the two ends of which outside the hopper are secured two wheels N, armed with radial spurs O, adapted to enter the ground and cause the rotation of the shaft or axle M, which has mounted centrally thereon a star-wheel P, the points of which pass up into the elongated opening or slot K in the bottom I of the hopper G. This shaft or axle M is journaled in bearings Q, which are vertically adjustable through the medium of set-screws $c\ c$, in order that the star-teeth may enter to varying degrees in the contents of the hopper, and thus liberate or drag out the same in greater or less quantities, and in connection with this adjustability of the star-wheel the slide L is also used in controlling the discharge from the hopper. I have shown the hopper and its connections as adapted to be secured to the rear end of the plow-beam; but by the employment of suitable strap connections R R (see Fig. 1) on the side of the hopper and the use of bails or loops similar to F the hopper, &c., may be secured in lateral or side relation to the plow by hanging the bails on suitable hooks secured to a movable block or support S, Fig. 1, adapted to be clamped at any desired point of the beam by screw bolts and nuts T. The hopper and its attachments may be entirely removed from the plow in going to and from work, or, when not needed at all, by simply lifting the bails or loops off of the hooks E E', and for this purpose and for lifting the hopper and its wheels N when turning corners the hopper may be supplied with handles or any other lifting device.

I have not given any proportions, except that the base of the hopper should be narrower than the mold-boards of the plow, because the proportions may be varied to suit convenience, or as circumstances may require.

Instead of arranging the bottom I of the hopper above the shaft of the star-wheel P, as shown in solid lines at Fig. 3, and providing the shaft of said wheel with adjustable bearings, the bottom of the hopper may be located below the star-wheel and shaft, as shown in dotted lines at Fig. 3, and when so arranged the star-wheel and shaft serve to stir the contents of the hopper, and the capacity of the latter is also increased and the absolute necessity for adjustability of the shaft is avoided.

What I claim as new, and desire to secure by Letters Patent, is—

In combination with the plow or cultivator frame having the hooks E E' and movable block or support S, adapted to be clamped at any desired locality, the hopper G, provided with hinged bails F and having journaled near the bottom in adjustable bearings Q a rotary shaft M, provided with spur-wheels N and feed-wheel P, the latter rotating within a slot K, made adjustable by a slide L, all substantially as and for the purposes set forth.

In testimony whereof I affix my signature in presence of two witnesses.

WALTER T. G. COBB.

Witnesses:
C. W. SELLERS,
O. C. MOORE.